Sept. 28, 1965  G. HESSEL  3,208,104
ORNAMENTATION OF PLASTIC ARTICLES
Original Filed Feb. 15, 1961  2 Sheets-Sheet 1

INVENTOR
GUSTAV HESSEL

BY Mestern and Mestern
AGENTS

Sept. 28, 1965 G. HESSEL 3,208,104
ORNAMENTATION OF PLASTIC ARTICLES
Original Filed Feb. 15, 1961 2 Sheets-Sheet 2

INVENTOR
GUSTAV HESSEL

BY *Meslem and Meslem*

AGENTS

United States Patent Office 3,208,104
Patented Sept. 28, 1965

3,208,104
ORNAMENTATION OF PLASTIC ARTICLES
Gustav Hessel, Wald, Zurich, Switzerland, assignor to Ornapress A.G., Zurich, Switzerland
Original application Feb. 15, 1961, Ser. No. 89,390, now Patent No. 3,180,776. Divided and this application Mar. 23, 1962, Ser. No. 189,942
Claims priority, application Switzerland, Nov. 15, 1951, 73,784/51; Nov. 6, 1952, 85,485
5 Claims. (Cl. 18—19)

The invention relates to the ornamentation of plastic articles and, more particularly, to devices serving that purpose. It is a division of my co-pending application Ser. No. 89,390, filed Feb. 15, 1961, now Patent No. 3,180,776 which is a continuation-in-part of my application Ser. No. 714,468, filed Feb. 11, 1958, now abandoned, which in turn had been a continuation-in-part of my application Ser. No. 320,368, filed Nov. 14, 1952, and now abandoned.

In particular, the invention relates to a device for pre-shaping decorated and resin-bound cellulose sheets to be used for the surface ornamentation of molted plastic objects. These sheets hereinafter are referred to as "color supports."

The color support obtained by the combination of specific factors is flexible so that, by means of a special device according to this invention, non-planar and/or irregular surfaces can be decorated, for instance deep dishes and bowls, without causing the color support to tear. It also is supple and does not break when molded under the customary conditions; is tear-resistant thus can be printed; is porous; can be saturated with ease since it is absorbent; has wet strength; and is pure.

Figure 1:
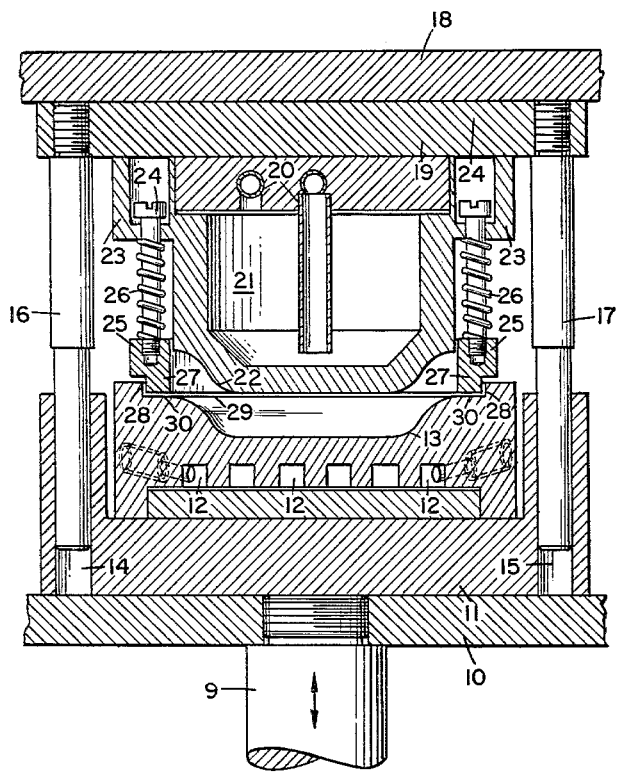

In the accompanying drawing, FIG. 1 is a vertical cut through a device for the shaping of the color supports.

The vertically moving piston 9 supports plates 10, 11 which hold the lower die or mold 13 which is heatable by feeding hot water or the like through the conduits 12 in mold 13. Within the cylindrical ducts 14, 15 of plates 10, 11, the rods 16, 17 slide which are fastened to the upper, stationary cover plate 18. Plate 18, in turn rests on columns which are not shown. On the bottom side of cover plate 18, die holder 19 is disposed which has a water-heatable hollow space 21. The water is furnished through pipe 20. Die holder 19 also carries the male die 22. Around the circular assembly 19–22, four guide bolts 24 are disposed on a stem 23, placed at 90° from each other, which are screwed into a ring 25 surrounding die 22. The guide bolts carry springs 26 which act on ring 25. The bottom side of the thus spring-loaded ring 25, by means of its recess 27, can rest on the upper and inner recess 28 of mold 13 and is adjusted in such a manner that it is situated a little lower than the lower horizontal limit of die 22 when the machine is open.

When the device is operated, plates 10–12 with mold 13 are lowered, and a printed and resin-impregnated color support 29 is laid into the mold 13. Upon raising plates 10–12, the spring-loaded ring 25 comes to rest on the outer rim 30 of die 22, before the latter touches color support 29, thus securely holding rim 30 in such a manner that, upon further raising of mold 13, the color support is pulled between the heated mold 13 and die 22 without folding or pleating and is shaped to their form under the influence of heat and pressure. Simultaneously, the spring-loaded ring 25 allows applying a certain amount of after-pull on the outer rim of color support 29 so that tearing and similar effects are averted. The time for shaping of the color support, depending on the quality and thickness, ranges between 2 and 20 seconds, the temperature of the heating fluid is 50–60° C.

Figure 2:
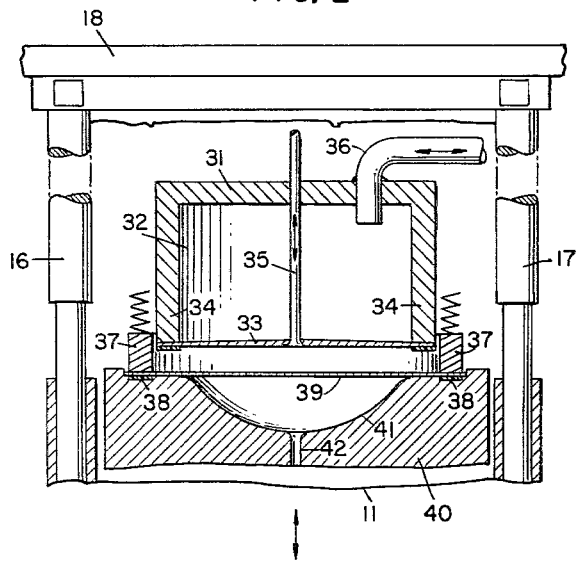
Figure 3:
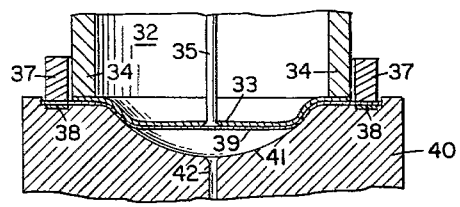
Figure 4:
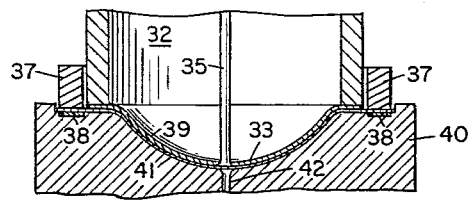

A special embodiment of the shaping or pre-shaping operation is shown in FIGS. 2 to 4.

FIGS. 2, 3 and 4 are vertical cuts through the mold and die assembly showing different positions of the die.

Male die 31 corresponds to die holder 19 in FIG. 1, but is not furnished with a solid bottom. Instead, it has a hollow space 32 whose lower end is closed by a membrane or diaphragm 33. The latter tapers toward both rims and is fastened to the lower rim 34 of die 31. Membrane 33 is punctured in its center by a conduit 35 through which air can be admitted or withdrawn. Pipe 36 facilitates introduction into space 32 of water having a temperature of 50–60° C. by means of a pump (not shown).

In this embodiment the male die 31, which may be circular, also is surrounded by a ring 37 which is spring-loaded. The otuer rim of the lower surface of ring 37 firmly secures the color support 39, lying on a plastic insert 38, made, e.g., of Teflon (registered trademark for polytetrafluoroethylene), to shaping block 40. Mold 41 also is provided, at its lowest point, with an air inlet or outlet, conduit 42.

FIG. 2 shows the initial position of the male die 31. Color support 39 rests on the shaping block 40 and is firmly secured thereto on its rim by the spring-loaded ring 37. Conduits 35 and 42 are in open position, hence, permit the escape of air from between membrane 33 and color support 39 and from between color support 39 and mold 41, respectively. At the instant at which shaping block 40 is moved upwardly and color support 39 is firmly held by the lower ring 37, provided with the Teflon insert 38, i.e., at the instant at which membrane 33 and color support 39 touch each other, water at a temperature of 50–60° C. is introduced into space 32 through conduit 36 by means of a pump (not shown). Since the rim part of membrane 33 is thinner than its center, the water exerts its greatest strength on the outer rim of color support 39 thus effecting a change in structure, i.e., a loosening of these portions of the color support so that they follow closely the contours of the upper parts of mold 41 without folding or creasing thus allowing a complete and faultless pre-shaping of the color support, as is shown in FIGS. 3 and 4. After termination of the shaping operation of color support 39, conduit 35 is opened so that air can enter, the device can be opened, and shaping block 40 and mold 41 can be lowered without carrying the color support 39 along or damaging the same.

When the assembly 19–22, as shown in FIG. 1, is not circular, but is for color supports of other shapes, e.g. rectangular, square or other, ring 25 can be replaced by a frame of corresponding shape. The same is true for the embodiment shown in FIGS. 2–4, where male die 31 can be of non-circular shape and ring 37 can be replaced by a frame of corresponding shape.

The color support after pre-shaping in the device described above is in a condensation stage which is called "pre-condensation" or often is referred to as the "B-stage." Before pre-condensation, the resin is said to be in the "A-stage" and, after final condensation, is in the "C-stage." This nomenclature applies to condensation resins, especially to phenol-formaldehyde, urea-formaldehyde and melamine-formaldehyde resins. In the B-stage, the resins are incompletely cured and are soluble and fusible, in contrast to the C-stage, wherein the resins have become insoluble and infusible. It should also be pointed out that the three resins named above are miscible with each other in all proportions in the A-stage and can be combined without difficulty in the B-stage, e.g., a solution of one of these in the B-stage with any other in the B-stage also is miscible in all proportions. The resins can also be combined by molding them together in the B-stage so that they attain the C-stage jointly thus forming an indivisible unit. Therefore, it is feasible to use, e.g., a phenol-formaldehyde impregnated color support on a blank made from urea-formaldehyde or to use any other combination.

The color support thus pre-shaped now is ready for combination with a blank consisting of one of the resins named above which may contain a filler. The blank also is in the B-stage and conforms in shape to that of the color support. The assembly of blank and color support is molded together to the C-stage, and an integrated decorated body thus is obtained.

I claim as my invention:

1. In a device for pre-shaping decorated and impregnated cellulose sheets bound with a resin and having a thickness of 1 to 8 mils, to be used in the manufacture of ornamented plastic bodies, said device comprising a vertically moving piston; a support plate disposed at the upper end of said piston; a cylindrically hollow vertical extension on each side of said support plate; a heatable female mold resting on said support plate; a horizontal cover plate forming the upper limit of the device; vertical cylindrical rods sliding within said hollow extensions, extending to and fastened, at their upper end, to said cover plate; vertical die holder disposed on the lower side of said cover plate and being hollow and heatable; a male die disposed on the bottom of said die holder; a plurality of guide bolts disposed at the upper end of said die holder; springs surrounding each of said bolts; the improvements which comprise a frame held in place by said bolts, having a recess resting on said mold, said mold being provided with a corresponding recess to receive said frame; said frame being adjustable so as to be situated slightly lower than said die when said device is in open position; said frame securely holding said cellulose sheets firmly in place both prior to and during shaping; said male die being a diaphragm tapering in thickness from the center to the outer rim; an inlet for warm water disposed between said die and the hollow of said die holder; a first conduit traversing the center of said diaphragm for admitting air and allowing same to escape upon closing of the device; a second conduit for the like purpose disposed in the center of said female mold and constituting a continuation of said first conduit; and a plastic insert between said female mold and said cellulose sheets for their support.

2. The device as defined in claim 1, wherein said piston and said corresponding frame are ring-shaped.

3. The device as defined in claim 1, wherein said piston and said corresponding frame are non-circular.

4. The device as defined in claim 3, wherein said piston and said corresponding frame are rectangular.

5. In a device for pre-shaping decorated and impregnated cellulose sheets bound with a resin and having a thickness of 1 to 8 mils, to be used in the manufacture of ornamented plastic bodies, said device being provided with a vertically moving piston; a support plate disposed at the upper end of said piston; a cylindrical hollow vertical extension on each side of said support plate; a heatable female mold resting on said support plate; a horizontal cover plate forming the upper limit of the device; vertical cylindrical rods sliding within said hollow extensions, extending to and fastened at their upper end, to said cover plate; a vertical die holder disposed on the lower side of said cover plate and being hollow and heatable; a male die disposed thereon; a plurality of guide bolts disposed at the upper end of said die holder; springs surrounding each of said bolts; a frame held in place by said bolts for holding said cellulose sheets firmly in place both prior to and during shaping and preventing creasing and folding; and means for actuating both said piston and said male die; the improvements which comprise said male die being a diaphragm tapering in thickness from the center to the outer rim; an inlet for warm water disposed between the hollow of said die holder and said die; a first conduit traversing the center of said diaphragm for admittance of air and allowing the same to escape upon closing of the device; a second conduit for the like purpose disposed in the center of said female mold and constituting a continuation of said first conduit; said female mold being provided with a recess corresponding in contour to said frame; and a plastic insert disposed in said recess to resiliently clamp said cellulose sheets between said insert and said frame when the latter is brought into clamping position.

References Cited by the Examiner

UNITED STATES PATENTS

| | | | |
|---|---|---|---|
| 731,367 | 6/03 | Huber | 113—44 X |
| 1,115,858 | 12/63 | Mitchell. | |
| 1,760,288 | 5/30 | Stevens | 18—19 |
| 1,904,268 | 4/23 | Bronson | 18—19 X |
| 2,014,815 | 9/51 | Rutledge. | |
| 2,159,901 | 5/39 | Le Jeune | 113—49 X |
| 2,332,792 | 10/43 | Gross et al. | |
| 2,353,996 | 7/44 | Cook et al. | 264—316 |
| 2,378,642 | 6/45 | Kopplin | 18—56 |
| 2,385,083 | 9/45 | Kemerer. | |
| 2,399,188 | 4/46 | Janiskewski. | |
| 2,484,656 | 10/49 | Sikka et al. | 18—19 X |
| 2,575,734 | 11/51 | Schulman. | |
| 2,706,309 | 4/55 | Lampman. | |
| 2,747,225 | 5/56 | Zona | 18—2 |
| 2,783,727 | 3/57 | Hoffman. | |
| 2,796,634 | 6/57 | Chellis | 18—56 |
| 2,901,995 | 9/59 | Lavigne | 113—38 |
| 2,985,128 | 5/61 | Henrickson | 113—49 X |
| 3,058,154 | 10/62 | Howard et al. | 18—9 X |
| 3,072,969 | 1/63 | Du Bois | 18—55 |
| 3,138,826 | 6/64 | Jacobs et al. | 18—19 |

WILLIAM J. STEPHENSON, *Primary Examiner.*